Aug. 24, 1965 J. H. SNYDER 3,202,354
PREDETERMINING COUNTER
Filed Aug. 15, 1963
2 Sheets-Sheet 2

INVENTOR.
JAMES H. SNYDER
BY Alfred N. Feldman
ATTORNEY

United States Patent Office 3,202,354
Patented Aug. 24, 1965

3,202,354
PREDETERMINING COUNTER
James H. Snyder, Wayzata, Minn., assignor to Honeywell Inc., a corporation of Delaware
Filed Aug. 15, 1963, Ser. No. 302,310
10 Claims. (Cl. 235—132)

This invention relates generally to an improved output device for an actuating or predetermining counter and more specifically concerns the design and use of a mechanical auxiliary output shaft which will provide a rotational output at the end of the predetermined count.

Modern industrial and commercial processes often require the automatic stoppage of equipment at the end of a preset time period or after a certain number of units have been manufactured or transferred. It may be desirable to shut down an assembly line for maintenance purposes, for example, after a certain number of units have been built, and in fluid flow applications in which the volume of flow is measured by a meter, it is often necessary to automatically stop the flow after a certain volume has been transferred. The so called "predetermining counter" has often been used in these applications. Such a counter typically consists of a plurality of different order counter wheels mounted on a common shaft. The lowest order wheel is driven either continuously or intermittently by a device, the movement of which represents the units to be counted. In a fluid flow application, a flowmeter is used to drive the counter while in a timer application a clock motor is used. Each rotation of the lowest order wheel represents a selected quantity such as one gallon and each rotation of a higher order wheel represents a selected multiple of that quantity. In the standard decadal counter, a single rotation of a lower order wheel will effect a one-tenth rotation of the next higher order wheel through an appropriate transfer mechanism. The basic counter mechanism is well known in the art and merely forms the basis for the present invention.

When the predetermined number has been reached on the counter, a suitable mechanism must be employed to so detect and signal. In the past, both electrical and mechanical outputs have been achieved through the use of mechanisms based upon a common principle. This common principle is the fact that for each possible number combination, there is but a single possible position for each of the wheels. The wheels will therefore be in a different relative position for each possible number combination. To obtain a mechanical output, it has been a simple matter to provide a recess in the periphery of each wheel at the desired number position and to provide a roller or pawl assembly which will drop into these recesses only when the selected position is reached. Such a system is disclosed in the United States patent to Braun, 590,512, which issued Sept. 21, 1897. An electrical output can be achieved similarly by operating a switch with each counter wheel such that the switches are all closed only when the desired number has been reached. The United States patent to Jennings, 1,001,409 which issued Aug. 22, 1911, discloses such an apparatus.

The present invention was developed for use as a portion of the timing system for a mechanical munition fuze. Since no electric power was available in the fuze, a completely mechanical system was necessary. The general operation of the timing system is as follows:

Prior to launch of the munition, the counter mechanism is set to the desired time period. At launch a clock motor is activated which in turn operates the counter. Each complete rotation of the lowest order counter wheel by the clock motor represents a unit of time such as ten seconds. In the preferred embodiment, the counter wheels are set to the desired time and the clock motor drives them down to the zero position. When the zero position is reached, an output mechanism which is the subject of this invention causes arming of the munition.

The decision to use a predetermining counter as a timing device for the munition fuze was based upon several factors. One such factor is the ease at which the time can be set. If the counter is designed to read total seconds, the operator simply rotates the counter until the desired number of seconds appears on the face of the counter. There are no complicated vernier adjustments to make and a visual readout is available at a glance. The counter is also extremely accurate since a single rotation of the lowest order wheel can be made to represent a small increment of time. The accuracy of the device is also enhanced by the fact that the same wheels which provide the readout function also provide the output function. Since the final output is taken from only the lowest order wheel, the usual problem of lost motion or backlash between the counter wheels does not affect output accuracy. In addition, the timing device can be manufactured as a relatively small unit; an important consideration where available space is limited.

The usual mechanical output arrangement consisting of recesses in the counter wheels and a rocker assembly to drop into the recesses at the end of the predetermined count was considered unsuitable for this application. For one thing, such an assembly would occupy an unacceptable amount of space in the fuze. Most important, however, is the fact that such a spring loaded rocker arm assembly would not operate properly in the munition fuze environment. Such a fuze is often subjected to extreme vibration and to high inertial forces, either of which could cause erratic operation of the conventional output mechanism. In a fuzing system where safety and reliability are two most important factors, such a high probability of erratic operation cannot be tolerated.

The present invention consists of a novel output device that occupies a relatively small amount of space in the fuze package and is not susceptible to the erratic operation mentioned above. The device is basically a rotatable shaft which is mounted along the periphery of the counter wheels parallel to the counter wheel axis. Attached to the output shaft adjacent each wheel is a kicker tooth which is adapted to mesh with a cog member attached to the associated wheel. Also attached to the output shaft adjacent each wheel is at least one blocking tooth, the purpose of which is to prevent spurious rotation of the shaft.

To understand the physical operation of the system, an understanding of the underlying theory is necessary. Assume that a three wheel decade counter is being used. The lowest order wheel is rotated once every ten seconds, the next higher wheel goes through a complete revolution every hundred seconds and the highest order wheel rotates once per one thousand seconds. Assume further that the wheels are set to 284 seconds and that the clock motor is set to drive the wheels back to the 000 position, at which time an output is desired. The exact time at which the output is desired is the time at which the lowest order wheel reaches the 0 position for the last time. This desired last position is actually the 29th time that the lowest order wheel passes through the 0 position. This means that a mechanical output device cannot be placed in position to be operated by the lowest order wheel until it has made 28 revolutions through the 0 position. This 28th passage through the 0 position takes place when the counter reaches 010. Examining the system further, it can be seen that the middle wheel will begin passage through the 0 position when the counter reaches 209, 109 and 009; a total of three times. The highest order wheel will go to the 0 position only once, at 099. At 099, the only time that the highest order wheel will go to the 0 position, the middle wheel will have passed through the 0 position twice beginning at 209 and 109 with only 009 remaining. At 009, the last time the middle wheel reaches the 0 position, the lowest order wheel will have passed through the 0 position 28 times and will be making its final revolution before the desired event.

To utilize this sequence of events, the kicker teeth are attached to the output shaft such that only the highest order kicker tooth is in position to mesh with a cog on the associated wheel when the wheel reaches the 0 position. At 099 the cog on the highest order wheel will mesh with the kicker tooth to rotate the output shaft a partial turn. This partial rotation will place the next lower kicker tooth in position to be meshed with the middle wheel cog at 009 to in turn rotate the output shaft another partial turn. This second partial rotation places the lowest order kicker tooth in position to be contacted by the lowest order cog when 000 is reached. This final rotation of the output shaft at 000 is used to arm the fuze. In the preferred embodiment a full 90° shaft rotation is achieved between 001 and 000; a one second period.

If the timing of the wheels were changed such that the lowest order wheel would rotate each second, the final 90° rotation would take place in .1 second.

It is therefore a primary object of the present invention to provide an improved output mechanism for a predetermining counter.

It is a further object to provide an output device for a multiple wheel counter which will be actuated by the lowest order wheel at a preset position only after all higher wheels have successively reached a similar predetermined position.

Another object of the present invention is to provide a munition fuze timer utilizing a predetermining counter having a new and unique output means.

A still further object is to provide an output device for a predetermining counter which will give an output accurate the resolution limit of the lowest order counter wheel.

Yet another object of the present invention is to provide a rotary output shaft for a mechanical counter which is driven directly by the counter wheels; which occupies a minimum amount of space; and which is not adversely affected by vibration or inertial forces.

These and other objects of the present invention will become evident from the following description, taken in conjunction with the accompanying drawings, in which;

FIGURE 4 is an end view of the counter showing the reset knob for the output shaft.

Figure 2:
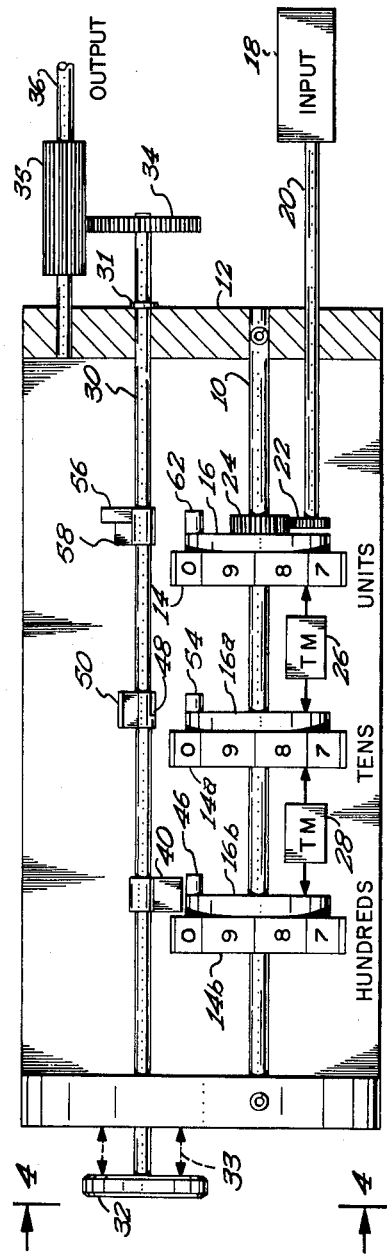
FIGURE 2 is an expanded side view of the subject predetermining counter showing the output shaft in the safe or starting position.

Refer now to the drawings to obtain a more detailed description of the subject invention. FIGURE 2 discloses all the elements of the subject predetermining counter in slightly expanded form. The counter unit consists of three counter wheels including a units wheel, a tens wheel, and a hundreds wheels as labeled on the drawing. The wheels are concentrically mounted on a common non-rotating shaft 10 which in turn is mounted in a frame or supporting structure 12. The units wheel consists of a number wheel 14 having ten digits from 0 to 9 evenly indexed around its periphery, and a predetermining wheel 16 of smaller diameter concentrically attached thereto. Number wheel 14 and predetermining wheel 16 may be built separately and then attached or they may be fabricated as one unit. The tens wheel consists of a similar number wheel 14a and predetermining wheel 16a. The hundreds wheel also includes a number wheel 14b and a predetermining wheel 16b. The units wheel is driven in rotary manner about axis 10 by an input mechanism 18 through a shaft 20 and a pair of gears 22 and 24. Since this system is being used as a munition fuze timer in the preferred embodiment, input 18 would be a mechanical clock escapement mechanism. The input speed and gear ratios are selected so that the units wheel will make one revolution every ten seconds. The index positions on number wheel 14 would thus each represent one second of time during operation.

Shown schematically between the units wheel and the tens wheel is a transfer mechanism 26. The details of the transfer mechanism are not disclosed since they are standard and well known in the art. Each time the units wheel makes one revolution, transfer mechanism 26 will advance the tens wheel one digit or one-tenth revolution. A full revolution of the tens wheel takes place in one hundred seconds which is equivalent to ten full rotations of the units wheel. A similar transfer mechanism 28 is connected between the tens wheel and the hundreds wheel to advance the hundreds wheel one-tenth revolution for each full revolution of the tens wheel. A full revolution of the hundreds wheel thus requires one thousand seconds.

In the munition fuze application, the counter wheels are manually set to the time which represents the time afer launch that it is desired to arm the bomb. This manual setting feature is included in the input mechanism 18 and is not disclosed in the drawings since the specific method of setting the counter wheels is not important to the invention. With the counter wheels set to the desired time period, clock motor 18 is initiated at launch to drive the counter wheels in a count down direction to return the wheels to a zero position. A mechanical output is desired when the units wheel reaches the zero position for the last time.

The mechanism which is adapted to provide this mechanical output at the end of the preset period includes an output shaft 30 which is journalled so as to freely rotate in frame 12. Attached to one end of output shaft 30 is a reset knob 32 and attached to the other end is an output gear 34. Output gear 34 transfers the rotation of output shaft 30 to a secondary output shaft 36 through a spline gear 35.

Figure 3:
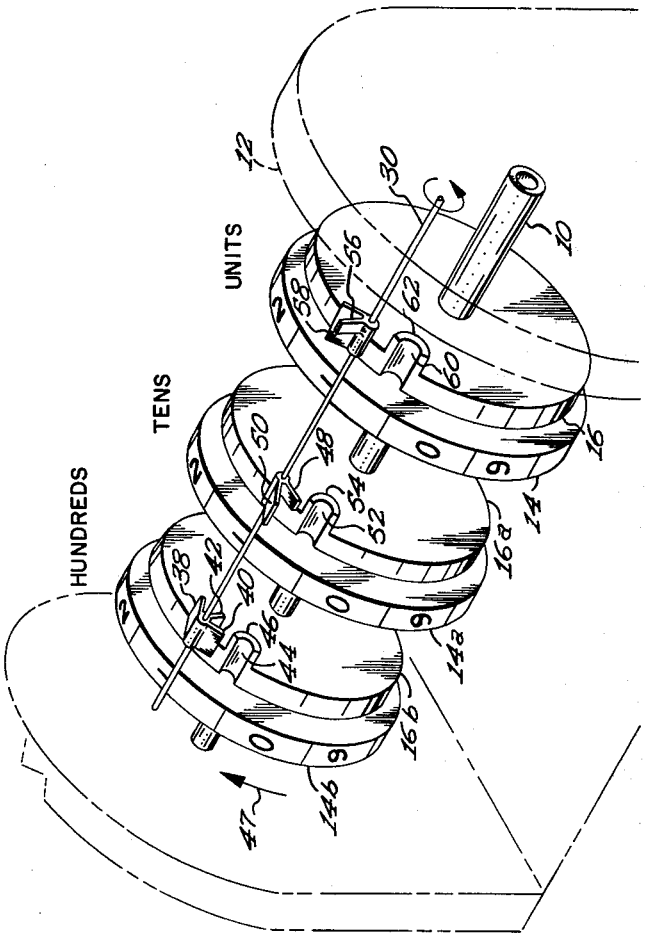
FIGURE 3 is an isometric view of the counter mechanism with the output shaft in the safe or starting position.

Refer now to FIGURE 3 for a more detailed drawing of the output shaft and the means to rotate the shaft. Attached to output shaft 30 adjacent each counter wheel is an engaging means or shaft rotating means embodied as a narrow kicker tooth, and at least one wide blocking tooth. In both FIGURE 2 and FIGURE 3, the output shaft is in the starting position or safe position. This is the required position for the shaft at the beginning of the count down. Associated with the hundreds wheel is a pair of blocking teeth 38 and 40 and a single kicker tooth 42. Blocking teeth 38 and 40 are mounted 90° apart on shaft 30 and are adapted to ride the periphery of predetermining wheel 16b to prevent rotation of shaft 30 in either direction. Kicker tooth 42 is a narrow tooth and does not engage the periphery of predetermining wheel 16b but lies parallel to the outer surface.

Formed in the periphery of wheel 16b is a recess 44 which is adapted to mesh with the blocking teeth 38 and 40 upon rotation of shaft 30. An actuating means or cog member 46 is mounted adjacent recess 44 and extends outwardly from the side of wheel 16b parallel to axis 10. Cog member 46 is adapted to mesh with kicker tooth 42 upon rotation of the hundreds wheel since the locus of positions occupied by cog member 46 lies in the plane which intersects kicker tooth 42. During clockwise rotation of the hundreds wheel as shown by arrow 47, the leading edge of cog member 46 first contacts kicker tooth 42 to initiate rotation of shaft 30 and then blocking tooth 40 meshes with the following edge of recess 44 to impart further rotation to shaft 30. At this point it is desired to merely disclose the physical structure of the system since the operation can be more easily understood with reference to FIGURE 1.

Mounted adjacent the tens wheel in FIGURE 3 is a kicker tooth 48; and a blocking tooth 50 which is again adapted to ride the periphery of predetermining wheel 16a and to mesh with a recess 52 in the periphery. A cog member 54 mounted adjacent recess 52 is again adapted to make contact with kicker tooth 48 at the appropriate time. Mounted adjacent the units wheel is a similar kicker tooth 56 and a blocking tooth 58. A similar recess 60 is formed in the periphery of predetermining wheel 16 and a cog member 62 is mounted adjacent thereto. It is the interaction of the kicker teeth, the blocking teeth, the recess and the cog members which provides a final rotation of output shaft 30 when the counter wheels all reach the zero position, or to be more accurate, when the units wheel reaches the zero position for the last time.

Figure 1:
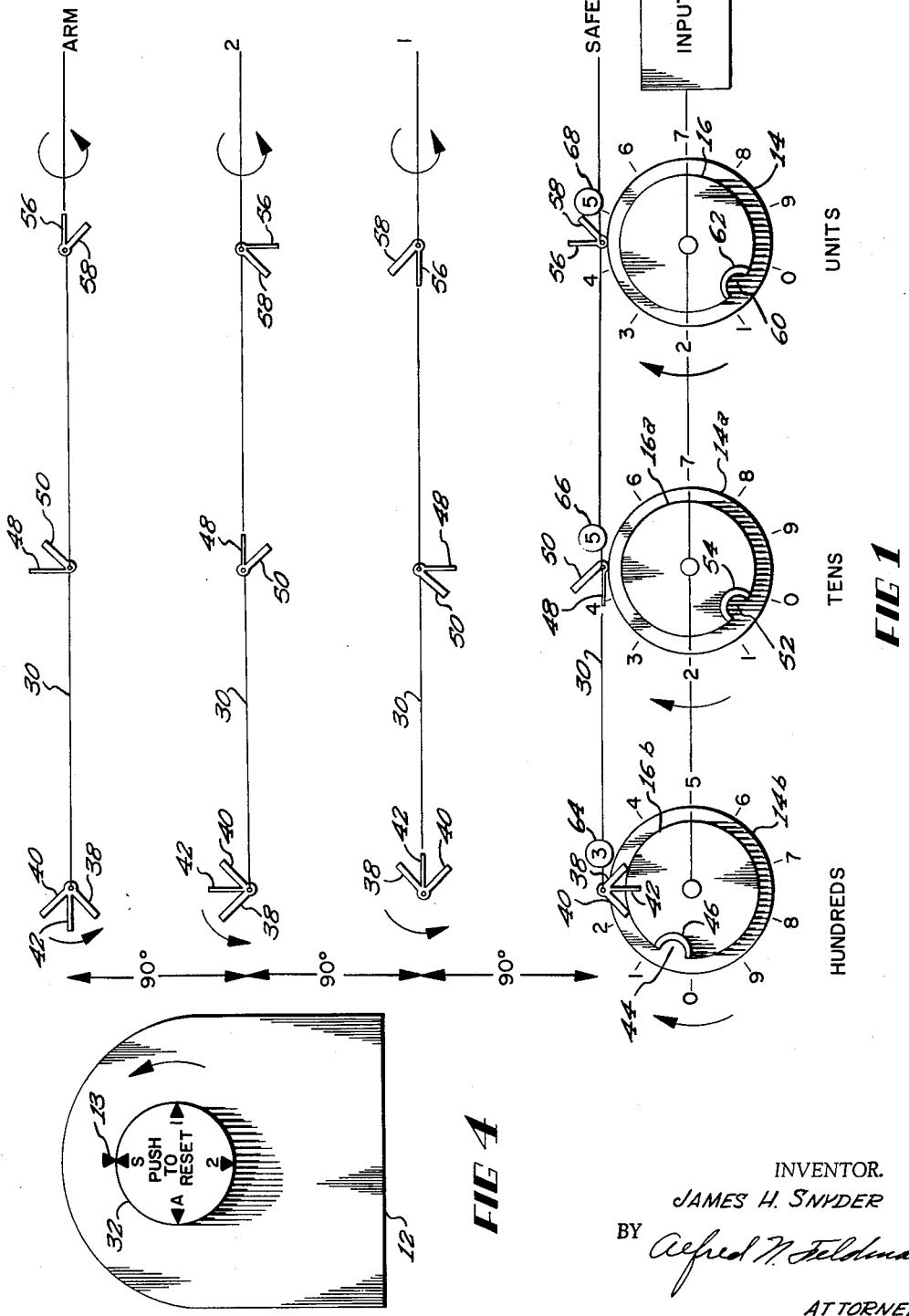
FIGURE 1 is a schematic representation of the counter mechanism and output shaft showing the position of the output shaft at four different stages of the counting cycle.

FIGURE 1 is a schematic representation of the essential parts of the subject counter mechanism which shows the position of the output shaft at different stages of the count down cycle. The input 18 to the three counter wheels is again a clock mechanism which is adapted to rotate the units wheel once every ten seconds. It can be seen that output shaft 30 will assume four distinct positions during the count down cycle. The safe position is that position already disclosed in FIGURES 2 and 3. The shaft then moves during count down to position 1, then to position 2, and finally at the end of the count down cycle to the final or arm position shown at the top of FIGURE 1. In this diagram the counter wheels have been set to read 355 seconds as indicated by the read-out positions 64, 66, and 68. Output shaft 30 has been placed in the safe position with only the highest order kicker tooth 42 in position to be contacted by associated cog member 46. The two kicker teeth 48 and 56 associated with the two lower order wheels are not in position to be contacted by the associated cog members. After launch, the units wheel is rotated once every ten seconds and the tens wheel once every hundred seconds. No rotation of the output shaft will take place until cog member 46 on the hundreds wheel contacts kicker tooth 42. In addition, spurious rotation of output shaft 30 in either direction is prevented by blocking teeth 38 and 40 which ride the periphery of predetermining wheel 16b.

The first 90° rotation of output shaft 30 takes place when the counter wheels change from a reading of 100 to a reading of 099. At this time the units wheel moves from 0 to 9, the tens wheel moves from 0 to 9, and the hundreds wheel moves from 1 to zero. This transfer takes place in one second. As the hundreds wheel goes from 1 to 0, the leading edge of cog member 46 contacts kicker tooth 42 to initiate rotation of output shaft 30. Blocking tooth 40 then meshes in recess 44 to complete the 90° rotation of the output shaft. At this point the shaft has been moved to the position labeled 1 in FIGURE 1. Blocking tooth 40 now rides the periphery of predetermining wheel 16b to prevent clockwise rotation of output shaft 30 and blocking tooth 50 rides the periphery of predetermining wheel 16a to prevent counterclockwise rotation of the output shaft. At this time kicker tooth 48 has been moved into position to be contacted by cog member 54 on the tens wheel. The lowest order kicker tooth 56 is still not in position to be contacted by the lowest order cog member since the lowest order wheel has a number of revolutions yet to make.

The next rotation of the output shaft occurs when the counter reading goes from 010 to 009. This transfer also takes place in one second. As the tens wheel goes from 1 to 0 for this final time, cog member 54 meshes with kicker tooth 48 to initiate rotation of output shaft 30. Blocking tooth 50 then meshes with recess 52 to provide the remainder of the 90° rotation. At this time the output shaft has assumed the position shown as position 2 in FIGURE 1. Blocking tooth 50 now rides the periphery of predetermining wheel 16a to prevent clockwise rotation of output shaft 30 and blocking tooth 58 rides the periphery of predetermining wheel 16 to prevent counterclockwise rotation. Kicker tooth 56 has now been placed in position to be contacted by the lowest order cog member 62 at the end of the predetermined count.

This final rotation of the output shaft takes place between a counter reading of 001 and 000. As the units wheel goes from 1 to 0 this final time, cog member 62 contacts kicker tooth 56 to impart rotation to shaft 30, and blocking tooth 58 meshes with recess 60 to complete to 90° of rotation. When the counter reads 000 the output shaft will reach the armed position shown at the top of FIGURE 1. This final 90° of rotation takes place during the final one second of the set time period.

The system above described is positive acting since the output shaft is geared directly to the readout wheels. In addition, spurious rotation of the output shaft is prevented by the action of the blocking teeth. The output of the system requires no amplification since a full 90° shaft rotation is obtained in the last one second. If the counter wheels were arranged so that the units wheel would rotate once per second, the final 90° of shaft rotation would take place in one-tenth second.

A reset feature has been incorporated into the system to allow an operator to initially set the counter wheels and output shaft to the proper position. Referring again to FIGURE 2, it is noted that output shaft 30 is movable longitudinally in frame 12.

Longitudinal movement of output shaft 30 is normally prevented by a locking ring 31 and a second locking device 33 which is mounted between reset knob 32 and frame 12. Locking device 33 is not disclosed in detail since any number of mechanisms would be suitable for this purpose. In some situations, device 33 could be a simple spring. When the operator decides to set the counter wheels, he first removes locking device 33 and then presses reset knob 32 to move output shaft 30 to the right as shown in FIGURE 2. This movement clears the kicker teeth from the path of the associated cog members. After the wheels have been set to the desired number, the knob is pulled out to return the output shaft to the starting position. An elongated spline gear 35 on secondary output shaft 36 meshes with output gear 34 to allow longitudinal movement of output shaft 30. FIGURE 4 discloses the face of the reset knob 32. The positions on the knob correspond to the shaft positions disclosed in FIGURE 1. Initially the safe position or starting position is set to match a pointer 13 on frame 12. At any time during count down, the position of output shaft 30 can immediately be ascertained by referring to the reset knob.

The present invention has been described in conjunction with a three wheel counter. The same principles could be employed in a two wheel counter or in a counter having more than three wheels. The positions of the teeth on the output shaft would need to be changed but the same principles would apply. It is also possible that in some applications the blocking teeth would not be required. In those applications, more than one kicker tooth might be required for each wheel. This is a matter of engineering since the basic principle is the same. In other applications, the cog member might be mounted on the periphery of the wheel rather than on the side. This again is a matter of choice and engineering design. Neither is it necessary that a separate number wheel and predetermining wheel be employed. The numbers and the cog members could well be mounted on a single wheel.

The intermediate rotations of the output shaft can also be utilized to perform useful work. In the fuzing application, the arming function can be performed in three steps rather than just one. This increases the safety of the fuze. In a system where this counter is being used to stop the flow of fluid after a predetermined volume has been dispensed, the intermediate rotations of the output shaft can be utilized to decrease the flow gradually rather than to stop the entire flow suddenly at the last output.

In the preferred embodiment discussed in this application, the number wheels have been set to the desired number and then returned to a zero index or reference position to obtain the desired output. It would be a matter of engineering to change the system to allow starting at the zero index position and then proceed to count up to a predetermined number. This could be done by making the predetermining wheels movable with respect to the number wheels so that they could be rotated to the desired number position prior to use. The counter could then be run from zero up to the desired number at which time the output would result.

The invention here is based upon the realization that the highest order counting wheel will reach the desired number only once during the counting cycle. After the highest order wheel has reached this number the next lower wheel will reach its desired number only once more. Each lower order wheel will pass through the desired number many times prior to the time that an output is desired but after the next higher order wheel has reached its desired number for the final time, the lower order wheel will have only one more revolution to make. This same principle can be applied to any reasonable number of counter wheels.

From the above description it would be apparent that I have invented a new and unique mechanism for obtaining an output from a predetermining counter. Although the form of the invention described herein constitutes a preferred embodiment, it will be understood that changes may be made within the spirit of the invention limited only by the scope of the appended claims.

I claim as my invention:

1. A predetermining counter, comprising: a succession of counter wheels mounted on a common non-rotating axis and including a units wheel and a plurality of higher order wheels; driving means for rotating said units wheel at a predetermined rate; transfer means connecting each lower order wheel to a next higher order wheel; said counter wheels each comprising a number wheel having a series of numbers evenly indexed on the periphery thereof, and a predetermining wheel of small diameter concentrically attached to said number wheel; said predetermining wheels each having a recess formed in the periphery thereof adjacent a first index position on said number wheel; a separate cog member attached to an outer side of each of said predetermining wheels directly adjacent said recess and extending therefrom parallel to said common axis; a rotatable output shaft mounted adjacent the periphery of said counter wheels and parallel to said common axis; said output shaft having a separate kicker tooth affixed thereto for each of said predetermining wheels; each of said kicker teeth lying in a plane parallel to said outer side of the associated predetermining wheel and said plane intersecting said cog member; said output shaft having a first position with said kicker tooth of said highest order wheel lying in the path of said highest order cog member, and said lower order kicker teeth being mounted on said output shaft out of the path of said lower order cog members; said highest order cog member contacting said kicker tooth upon rotation of the first index position of said highest order counter wheel through the arc occupied by said kicker tooth to thereby rotate said output shaft to place said next lower kicker tooth in line with said next lower cog member; a similar sequence of events occurring succesisvely with each of said lower order teeth until said lowest order kicker tooth is placed in position to be contacted by said lowest order cog member on said units wheel at the end of the predetermined count; and at least one blocking tooth associated with each of said kicker teeth; said blocking teeth being mounted on said output shaft and adapted to ride the periphery of said associated predetermining wheel to prevent spurious rotation of said output shaft; said blocking teeth each meshing with said recess in said corresponding predetermining wheel to aid said corresponding kicker tooth in rotating said output shaft.

2. A predetermining counter, comprising: a succession of counter wheels mounted on a common axis and including a units wheel and two higher order wheels; driving means for rotating said units wheel at a predetermined rate; tens transfer means connecting each lower order wheel to a next higher order wheel; said counter wheels each comprising a number wheel having a series of numbers evenly indexed on the periphery thereof, and a predetermining wheel of smaller diameter concentrically attached to said number wheel; said predetermining wheels each having a recess formed in the periphery thereof adjacent a first index position on said number wheel; a separate cog member attached to an outer side of each of said predetermining wheels directly adjacent said recess and extending therefrom parallel to said common axis; a rotatable output shaft mounted adjacent the periphery of said counter wheels and parallel to said common axis; said output shaft having a separate kicker tooth affixed thereto for each of said predetermining wheels; each of said kicker teeth lying in a plane parallel to said outer side of the associated predetermining wheel and said plane intersecting said cog member; said output shaft having a first position with said kicker tooth of said highest order wheel lying in the path of said highest order cog member, and said lower order kicker teeth being mounted on said output shaft out of the path of said lower order cog members; said highest order cog member contacting said kicker tooth upon the rotation of the first index position of said highest order counter wheel through the arc occupied by said kicker tooth to thereby rotate said output shaft to place said next lower kicker tooth in line with said next lower cog member; a similar sequence of events then occurring with said next lower counter wheel and kicker tooth to place said units wheel kicker tooth in position to be contacted by said units wheel cog member at the end of the predetermined count; and at least one blocking tooth associated with each of said kicker teeth; said blocking teeth being mounted on said output shaft and adapted to ride the periphery of said associated predetermining wheel to prevent spurious rotation of said output shaft; said blocking teeth meshing with said recess in said corresponding predetermining wheel to aid said corresponding kicker tooth in rotating said output shaft.

3. A predetermining counter, comprising: a succession of counter wheels mounted on a common non-rotating axis and including a units wheel and a plurality or higher order wheels; driving means for rotating said units wheel at a predetermined rate; transfer means connecting each lower order wheel to a next higher order wheel; said counter wheels each having a series of numbers evenly indexed on the periphery thereof and having a recess formed in said periphery at a first index position; a separate cog member attached to an outer side of each of said wheels directly adjacent said recess and extending therefrom parallel to said common axis; a rotatable output shaft mounted adjacent the periphery of said counter wheels and parallel to said common axis; said output shaft having a separate kicker tooth affixed thereto for each of said wheels; each of said kicker teeth lying in a plane parallel to said outer side of the associated wheel and said plane intersecting said cog member; said output shaft having a first position with said kicker tooth of said highest order wheel lying in the path of said highest order cog member, and said lower order kicker teeth being mounted on said output shaft out of the path of said lower order cog members; said highest order cog member contacting said kicker tooth upon rotation of the first index position of said highest order counter wheel through the arc occupied by said kicker tooth to thereby rotate said output shaft to place said next lower kicker tooth in line with said next lower cog member; a similar sequence of events occuring successively with each of said lower order teeth until said lowest order kicker tooth is placed in position to be contacted by said lowest order cog member on said units wheel at the end of the predetermined count; and at least one blocking tooth associated with each of said kicker teeth; said blocking teeth being mounted on said output shaft and adapted to ride the periphery of said associated wheel to prevent spurious rotation of said output shaft; said blocking teeth each meshing with said recess in said corresponding wheel to aid said corresponding kicker tooth in rotating said output shaft.

4. A predetermining counter, comprising: a succession of counter wheels each having a series of numbers evenly indexed on the periphery thereof mounted on a common axis and including a units wheel and two higher order wheels; driving means for rotating said units wheel at a predetermined rate; transfer means connecting each lower order to a next higher order wheel; a separate cog member attached to an outer side of each of said wheels directly adjacent a first index position on said periphery and extending therefrom parallel to said common axis; a rotatable output shaft mounted adjacent the periphery of said counter wheels and parallel to said common axis; said output shaft having a separate kicker tooth affixed thereto for each of said wheels; each of said kicker teeth lying in a plane parallel to said outer side of the associated wheel and said plane intersecting said cog member; said output shaft having a first position with said kicker tooth of said highest order wheel lying in the path of said highest order cog member, and said lower order kicker teeth being mounted at different angular positions on said output shaft out of the path of said lower order cog members; said highest order cog member contacting said kicker tooth upon the rotation of the first index position of said highest order counter wheel through the arc occupied by said kicker tooth to thereby provide the force necessary to rotate said output shaft less than one revolution to place said next lower kicker tooth in line with said next lower cog member; a similar sequence of events then occuring with said next lower counter wheel and kicker tooth to place said units wheel kicker tooth in position to be contacted by said units wheel cog member at the end of the predetermined count to provide an output that is accurate to the resolution limit of said units wheel; and means attached to said output shaft to prevent rotation of said shaft until a cog member contacts an associated kicker tooth.

5. A predetermining counter, comprising: a succession of counter wheels each having a plurality of index positions on the periphery thereof mounted on a common axis and including a units wheel and two higher order wheels; means for setting said wheels to predetermined number above a zero index position; transfer means connecting each lower order wheel to a next higher order wheel; means for driving said units wheel to thereby return said counter wheels to said zero index position; a separate cog member attached to the same index position on each of said wheels; a rotatable output shaft mounted parallel to said common axis and adjacent said cog members with said counter wheels in said zero index position; said output shaft having a separate kicker tooth affixed thereto for each of said wheels; each of said kicker teeth lying in a plane intersecting the locus of positions occupied by said associated cog member; said output shaft having a first position with said kicker tooth of said highest order wheel lying in the path of said highest order cog member, and said lower order kicker teeth being mounted at different angular positions on said output shaft out of the path of said lower order cog members; said highest order cog member contacting said kicker tooth upon the rotation of said cog member through the arc occupied by said kicker tooth to thereby provide the force necessary to rotate said output shaft less than one revolution to place said next lower kicker tooth in line with said next lower cog member; a similar sequence of events then occurring with said next lower counter wheel and kicker tooth to place said units wheel kicker tooth in position to be contacted by said units wheel cog member at the end of the predetermined count to provide an output that is accurate to the resolution limit of said units wheel; means attached to said output shaft to prevent spurious rotation thereof; and means for resetting said output shaft to said first position.

6. A predetermining counter, comprising: a succession of counter wheels, each having a series of numbers indexed on the periphery thereof, mounted on said common axis and including a units wheel and at least one higher order wheel; means for rotating said units wheel; transfer means connecting each lower order wheel to a next higher order wheel; cog means attached to each of said wheels directly adjacent a first index position thereon; a rotatable output shaft mounted adjacent the periphery of said counter wheels and parallel to said common axis; and said output shaft having a separate kicker tooth affixed thereto for each of said wheels; each of said kicker teeth lying in a plane intersecting the locus of positions occupied by said associated cog means; said output shaft having a first position with said kicker tooth of said highest order wheel lying in the path of said highest order cog means, and said lower order kicker teeth being mounted at different angular positions on said output shaft out of the path of said lower order cog means; said highest order cog means contacting said kicker tooth upon rotation of the first index position of said highest order counter wheel through the arc occupied by said kicker tooth to thereby provide the force necessary to rotate said output shaft to place said next lower kicker tooth in line with said next lower cog means; a similar sequence of events occurring successively with each of said lower order teeth until said lowest order kicker tooth is placed in position to be contacted by said lowest order cog means on said units wheel at the end of the predetermined count to thereby rotate said output shaft.

7. A predetermining counter, comprising: a set of coaxially mounted operatively connected different order number wheels; cog means fixedly mounted on each of said wheels at a zero index position; means for setting said number wheels to a predetermined number; means for counting down said counter from said predetermined number setting to a first position with said zero index positions aligned; a rotatable output shaft mounted adjacent said cog means with said wheels in said first position; and individual engaging means mounted at different angular positions on said shaft adjacent each of said wheels; each of said individual engaging means being adapted to mesh directly with said associated cog means upon rotation of said associated number wheel to provide motive power to partially rotate said output shaft; each of the lower order engaging means being rotated into position to mesh directly with said associated cog means only upon the partial rotation of said shaft by said next higher order engaging means and cog means.

8. A timing device, comprising: a predetermining counter having a set of coaxially mounted operatively connected different order number wheels each having a zero index position; means for setting said counter to a predetermined number; means for driving the lowest order number wheel in a countdown direction at a predetermined counting speed to return said counter to a first position with said zero index positions aligned; cog means mounted on each of said wheels at said zero index position; a rotatable output shaft mounted adjacent said zero index positions with said wheels in said first position; and shaft rotating means mounted on said output shaft adjacent each of said wheels; said shaft rotating means being mounted at spaced angular positions around said shaft and being adapted to engage said associated cog means upon rotation of said associated wheel to said zero index position to cause partial rotation of said output shaft; each of the lower order shaft rotating means being placed in position by said shaft to engage said associated cog means only upon rotation of said shaft by said next higher shaft rotating means; said lowest order shaft rotating means thereby providing a final rotational movement of said output shaft from the final rotation of said lowest order wheel upon said wheels reaching said first position.

9. A predetermined counter, comprising: a set of co-axially mounted operatively connected different order number wheels; actuating means fixedly mounted on each of said wheels at a reference position; means for setting said number wheels to a predetermined number; means for driving said counter from said predetermined number setting to a first setting with said reference positions aligned; movable output means mounted adjacent said actuating means with said wheels at said first setting; and individual engaging means mounted on said output means adjacent each of said wheels; said engaging means forming a driven connection directly with said actuating means upon rotation of said associated number wheel to provide the motive power necessary to cause partial movement of said output means; each of the lower order engaging means being initially disengaged from said corresponding actuating means and being moved into position to directly engage said associated actuating means only subsequent to the movement of said output means by said next higher order actuating means.

10. A predetermining counter, comprising: a set of at least two co-axially mounted operatively connected different order number wheels; means for setting said number wheels to a predetermined number; means for driving said counter from said predetermined number setting to a reference number setting; operatively connected output means mounted adjacent each of said number wheels; actuating means mounted on each of said wheels capable of forming a driving connection directly with an associated output means; said output means being positioned such that the first driving connection is made and a first output achieved as the highest order wheel returns to the reference number setting; and said output means being connected such that the first output positions said output means so that a second driving connection is made by the second highest order wheel only upon said wheel reaching said reference number setting for the last time whereby a single partial output occurs as each wheel reaches said reference number setting for the last time.

References Cited by the Examiner
UNITED STATES PATENTS

| | | | |
|---|---|---|---|
| 1,639,350 | 8/27 | Pitney et al. | 235—101 |
| 1,979,293 | 11/34 | Smith | 74—3.52 |
| 2,693,317 | 11/54 | Demeulenaere et al. | 235—136 |
| 3,038,659 | 6/62 | Unterberger | 235—136 X |
| 3,057,553 | 10/62 | Billeter | 235—132 |
| 3,089,616 | 5/63 | Wilson | 235—132 X |

LEO SMILOW, *Primary Examiner.*